UNITED STATES PATENT OFFICE.

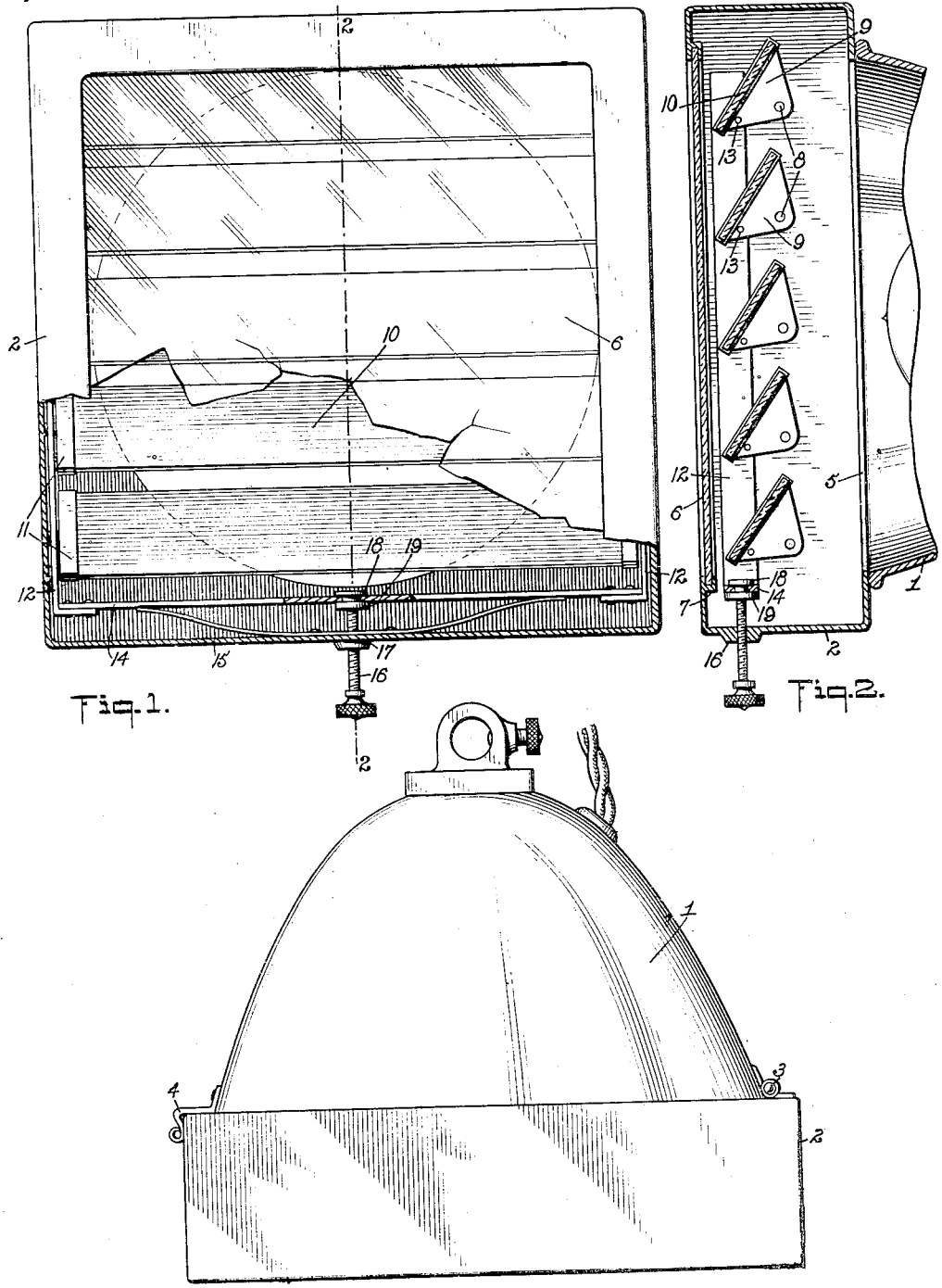

EMILE A. MINETTI AND BERTRAM B. BRIGGS, OF RUTHERFORD, NEW JERSEY.

ADJUSTABLE RAY CONTROL.

1,236,966.  Specification of Letters Patent.  Patented Aug. 14, 1917.

Application filed February 8, 1917. Serial No. 147,288.

*To all whom it may concern:*

Be it known that we, EMILE A. MINETTI and BERTRAM B. BRIGGS, both citizens of the United States, and residents of Rutherford, in the county of Bergen and State of New Jersey, have invented a new and Improved Adjustable Ray Control, of which the following is a full, clear, and exact description.

This invention relates to controlling devices for the rays of light from a lamp and has for an object the provision of an improved construction for easily directing the rays of light from the headlight of an automobile in order to secure any desired illumination and any desired dimming.

In the accompanying drawing:—

Figure 1 is a front view of a device embodying the invention, certain parts thereof being broken away for better illustrating the structure.

Fig. 2 is a section through Fig. 1 on line 2—2.

Fig. 3 is a top plan view of the structure shown in Fig. 1.

Referring to the accompanying drawing by numerals, 1 indicates a lamp of ordinary construction to which the casing 2 is connected by a hinge 3 whereby the casing 2 acts as the front door of the lamp, a suitable catch 4 being provided for holding the door closed. The rear of the casing is preferably provided with a round opening 5 through which the rays of light are projected, while the front of the casing is provided with a glass protecting pane 6 held in place by suitable supporting means 7.

Arranged at a convenient point between the front and back of the casing are rows of pivotal pins 8, there being one row on each side of the casing, each row of pins supporting a plurality of brackets 9 while each pair of brackets 9 supports a glass dimming member 10 held in place in any suitable manner, as for instance, by the turned over portions 11 of the brackets. The glass plates or members 10 are colored with any suitable color, as for instance, red, so as to allow an illumination but to eliminate the usual glare of the strong headlight. In addition, when the parts are set substantially as shown in Fig. 1 or slightly more closed, little or none of the rays will pass between the plates 10 at the upper part but a large number will pass between the plates at the lower part of the device, but the last mentioned rays will strike the ground near the automobile and will not in any way present a glare to a pedestrian meeting the automobile.

In order to adjust the plates 10 for different conditions, a pair of side plates 12 are provided and the various brackets 9 on both sides of the casing are connected thereto by suitable pivotal pins 13, whereby when the side plates 12 are moved upwardly or downwardly the brackets will be moved pivotally and the angle at which the dimming plates 10 are arranged will be changed. A cross bar 14 connects the side plates 12 and together with said side plates forms a frame which is urged upwardly by a spring 15. An adjusting screw 16 extends through a threaded member or enlargement 17 secured to the casing 2 and is provided with abutments or enlargements 18 and 19 on opposite sides of the bar 14, part of the screw 16 extending through the bar, as shown in Fig. 1, whereby when the screw is rotated bar 14 and parts connected therewith will be raised or lowered. This will adjust the position of the dimming plates 10 and will lock the plates 10 in any adjusted position, spring 15 acting as tension means for preventing rattling.

As above described, the plates 10 are made from glass or other transparent material and colored with any color desired so that an illumination may be provided, but if desired metal or other opaque plates could be used which would completely shut out the light from the upper part when turned to substantially the position shown in Fig. 2 while allowing light to be projected downwardly and forwardly for a short distance.

What we claim is:

1. In a device of the character described, a casing, a plurality of pivotally mounted shutters, means for swinging said shutters on their pivotal points, said means including a cross bar, and a threaded member threaded through said casing and movably connected to said cross bar for adjusting the position of said shutters and locking the shutters in any desired position.

2. In a device of the character described, a casing, a frame arranged in said casing, a row of brackets on each side of said frame, a plate of glass connected with each pair of brackets, a vertical bar arranged adjacent each of said brackets, means for pivotally connecting said brackets to said bar, a transverse bar at the bottom connected with the first mentioned bars, and a screw mounted in said casing formed with spaced abutments, said screw extending through said transverse bar and arranged so that there will be an abutment on each side of said bar whereby when the screw is actuated said bar and parts connected therewith will be moved according to the direction of movement of the screw.

EMILE A. MINETTI.
BERTRAM B. BRIGGS.

Copies of this patent may be obtained for five cents each, by addressing the "Commissioner of Patents, Washington, D. C."